United States Patent [19]

Sutton et al.

[11] Patent Number: 5,044,318

[45] Date of Patent: Sep. 3, 1991

[54] HOG FEEDER

[75] Inventors: Steven E. Sutton; Bernard F. Kitten, both of Plains; Douglas B. Jewell, Liberal; Ben J. Standard, Jr.; Dwight G. Naber, both of Kismet, all of Kans.

[73] Assignee: Dekalb Swine Breeders, Inc., DeKalb, Ill.

[21] Appl. No.: 518,750

[22] Filed: May 3, 1990

Related U.S. Application Data

[63] Continuation of Ser. No. 284,305, Dec. 14, 1988, abandoned.

[51] Int. Cl.$^5$ .............................................. A01K 5/00
[52] U.S. Cl. ..................................... 119/53.5; 119/53; 119/902
[58] Field of Search ....................... 119/52.1, 53.4, 54, 119/55, 53, 52.4, 57, 53.5, 902

[56] References Cited

U.S. PATENT DOCUMENTS

| | | | |
|---|---|---|---|
| 1,194,053 | 8/1916 | Meyer | 119/54 |
| 2,335,337 | 11/1943 | Hedrick | 119/54 |
| 2,512,260 | 6/1950 | Powell | 119/53.5 |
| 2,544,578 | 3/1951 | Winkler | 119/54 |
| 3,074,377 | 1/1963 | Spencer | 119/54 |
| 4,353,329 | 10/1982 | Thibault | 119/53.5 |
| 4,462,338 | 7/1984 | Thibault | 119/53.5 |
| 4,582,023 | 4/1986 | Zumbahlen | 119/53.5 |
| 4,676,197 | 6/1987 | Hoover | 119/52.1 |

FOREIGN PATENT DOCUMENTS

| | | | |
|---|---|---|---|
| 1097995 | 3/1981 | Canada | 119/53 |
| 2563078 | 10/1985 | France | 119/54 |
| 206561 | 11/1923 | United Kingdom | 119/53.5 |
| 2187626 | 9/1987 | United Kingdom | 119/54 |

Primary Examiner—John G. Weiss
Attorney, Agent, or Firm—Kinzer, Plyer, Dorn, McEachran & Jambor

[57] ABSTRACT

This is concerned with a hog feeder which has a center feed supply with a feeding trough around it with vanes which move the feed out from a plateau in the center under the feed supply and a ledge which prevents the feed from falling into the trough by gravity or vibration thus requiring a hog to move the vanes to get feed.

22 Claims, 4 Drawing Sheets

HOG FEEDER

This is a continuation of co-pending application Ser. No. 07/284,305 filed on 12-14-88 now abandoned.

SUMMARY OF THE INVENTION

This invention is concerned with a hog feeder having a feeding trough divided into a number of feeding stations with means constructed to be operated by the hogs to move feed into the feeding stations.

A primary object of the invention is a hog feeder of the above type which is constructed and arranged so that feed will not flow from a central source to the feeding stations by gravity or vibration.

Another object is a hog feeder of the above type in which each feeding station has an individual hog operated feeding means so that feed will only be conveyed or brought to one or more of the feeding stations selected by a hog or hogs.

Another object is a hog feeder of the above type which has individual feeding vanes which, when operated by a hog, convey feed from a central station or supply location to a feeding trough on a selected basis.

Another object is a hog feeder of the above type which has an adjustable feeding gap between the supply station and the feeding trough.

Another object is a hog feeder which is specifically constructed to prevent hogs from clogging the feeding opening by licking it.

Another object is a hog feeder of the above type specifically constructed to minimize feed bridging.

Another object is a reservoir for a hog feeder of the above type made of plastic which prevents rust which could cause friction and bridging.

Another object is a plateau arrangement for a hog feeder of the above type which is elevated a distance above the bottom of the feeding trough and is positioned under a feed reservoir.

Another object is a jowl guard for a hog feeder of the above type which prevents a hog from carrying feed away from the feeding trough which might cling to his jowls or lower chin and wasting it.

Another object is an indicator arrangement for a hog feeder of the above type which will clearly indicate, upon manual adjustment, the size of the outlet opening to allow the herdsman to visually read the indicator from several feet away so that the feeding gap may be accurately adjusted and set as the hogs grow and need more or less feed flow.

Another object is a hog feeder of the above type that saves time in checking the setting of the feeding gap.

Another object is an indicator to indicate the gap setting in a hog feeder of the above type that magnifies the indication so that the gap can be accurately moved in small increments and set.

Another object is an alternate indicating gauge for a hog feeder of the above type that is adjusted by rotating the feed reservoir.

Another object is an alternate adjustment and indicating gauge which is operated by a handle at the top which rotates a center axle to move a feed cylinder vertically without the feed reservoir itself rotating.

Another object is alternate forms of vanes which may be contoured to selectively vary the feed rate through the feed gap opening.

Another object is a driver for the feed vanes in a hog feeder of the above type which extends into the bottom of the feeding trough to cause mixing.

Another object is a stepped feed platform for a hog feeder of the above type which provides the hog with dry feed areas in the trough bottom.

Other objects will appear from time to time in the ensuing specification and drawings.

BRIEF DESCRIPTION OF THE PREFERRED EMBODIMENT

Figure 1:
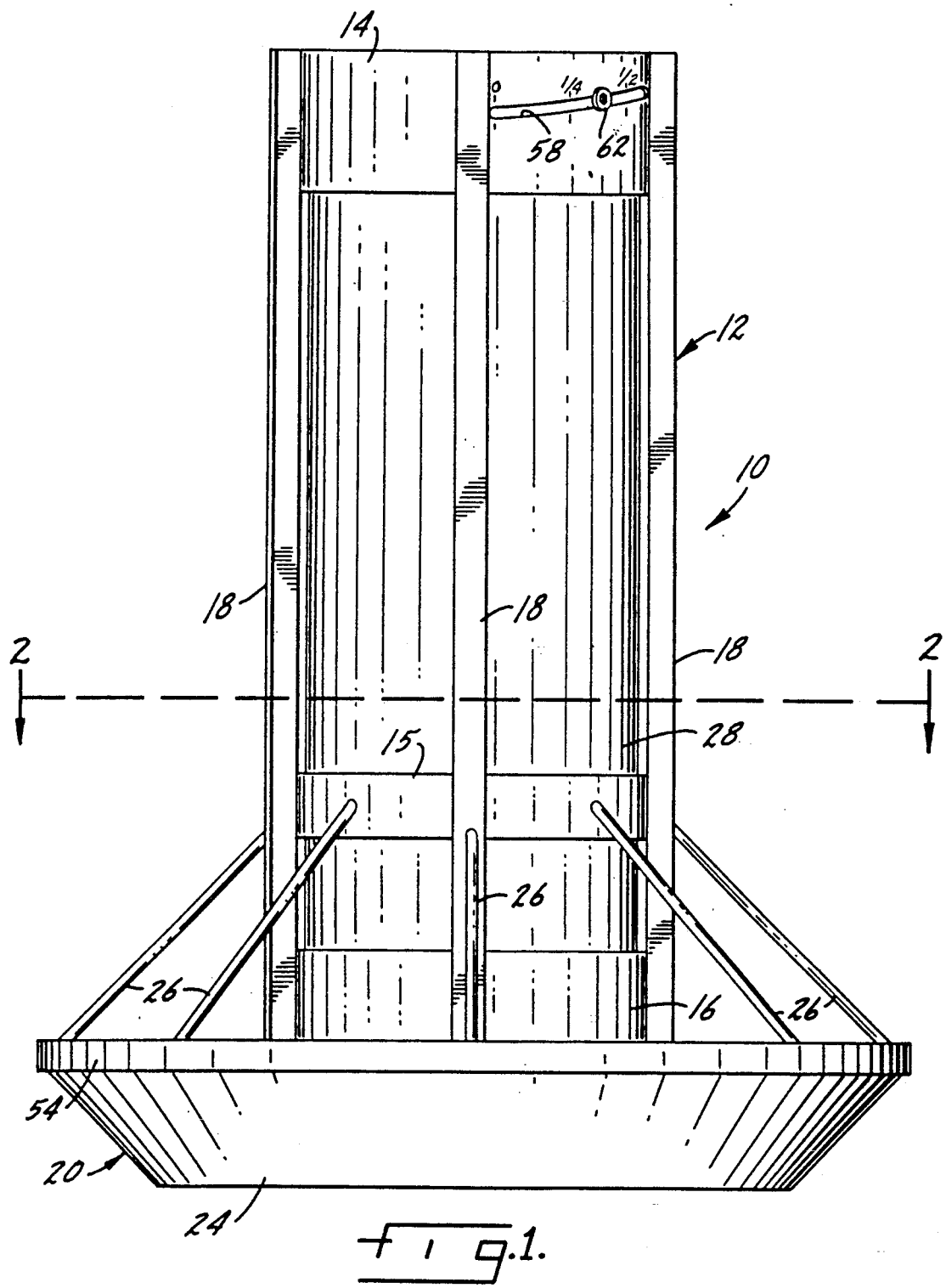
FIG. 1 is a side view of the hog feeder.

In FIG. 1 the pig feeder is indicated generally at 10 and may be considered to include a generally upright framework 12 having upper, central and lower guides or sleeves 14, 15 and 16 interconnected by a plurality of uprights 18 which may be in the form of angle irons, square tubes, or the like. The bottom includes a feed tray 20 which includes a frusto conical feed pan 24 which may be at approximately 45°. The top of the feed pan may be connected by a plurality of rods 26 to the central sleeve or upright. The upright framework supports or positions a cylinder 28 which may be a PVC pipe, for example on the order of 12" in diameter, which slides down in the upper and lower guides 14 and 16. The pipe defines a generally upright feed container or reservoir and, when made of plastic, minimizes or eliminates any bridging of the feed and also avoids any problems caused by corrosion, for example friction that could develop between the feed and the side of the pipe resulting in bridging.

Figure 3:
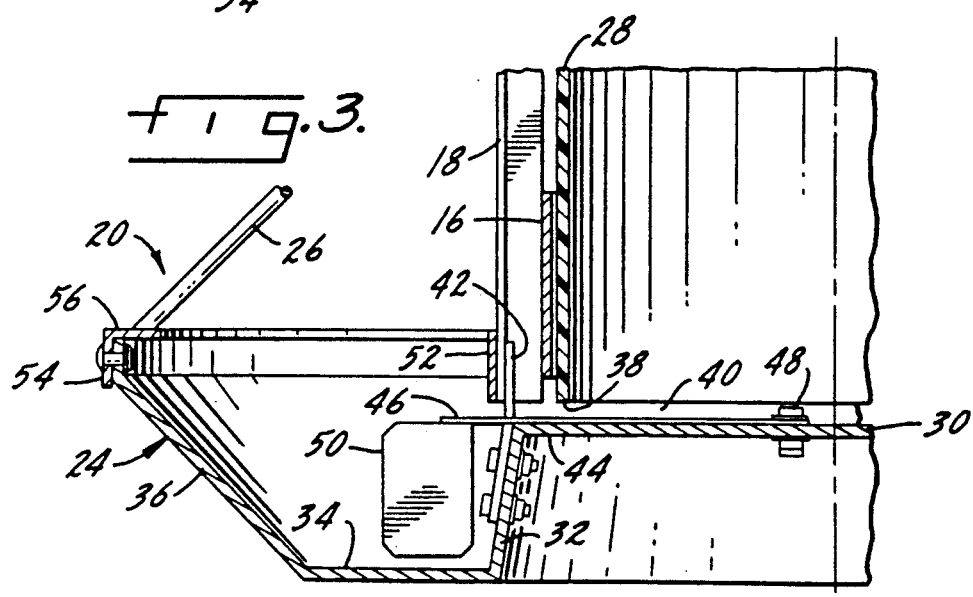
FIG. 3 is a partial section taken along line 3—3 of FIG. 2 on an enlarged scale.

As shown in FIG. 3, the base or bottom of the feeder may be formed with a raised or elevated plateau 30 which is turned down at a predetermined point into a circumferential inner wall 32, then outwardly into a circumferential bottom or plate 34, then upwardly in a generally frusto conical outer wall 36 which may be disposed at about 45°. The three parts 32, 34 and 36 make up a circumferential feeding trough which is subdivided into a plurality of feeding stations by the rods or reinforcements 26.

The bottom edge or lower end 38 of the supply tube approaches but does not contact the plateau 30 as shown in FIG. 3 thus providing a generally continuous peripheral gap 40 through which feed may flow outwardly to the feeding trough A plurality of support straps 42 suitably connected by bolts or the like to the incline 32 of the base are connected at their upper ends to the uprights 18 to support the framework. Four such straps 42 may be used but more or less are permissible. The straps are more or less aligned with the braces 26 to define the individual feeding stations in the feeding trough.

The base or plateau 30 extends a predetermined distance, indicated at 44, beyond or outwardly of the feed gap 40 which functions as a ledge of sufficient extent to prevent either gravity or vibration from causing feed flow outwardly from the gap 40 to the feeding trough.

Figure 2:
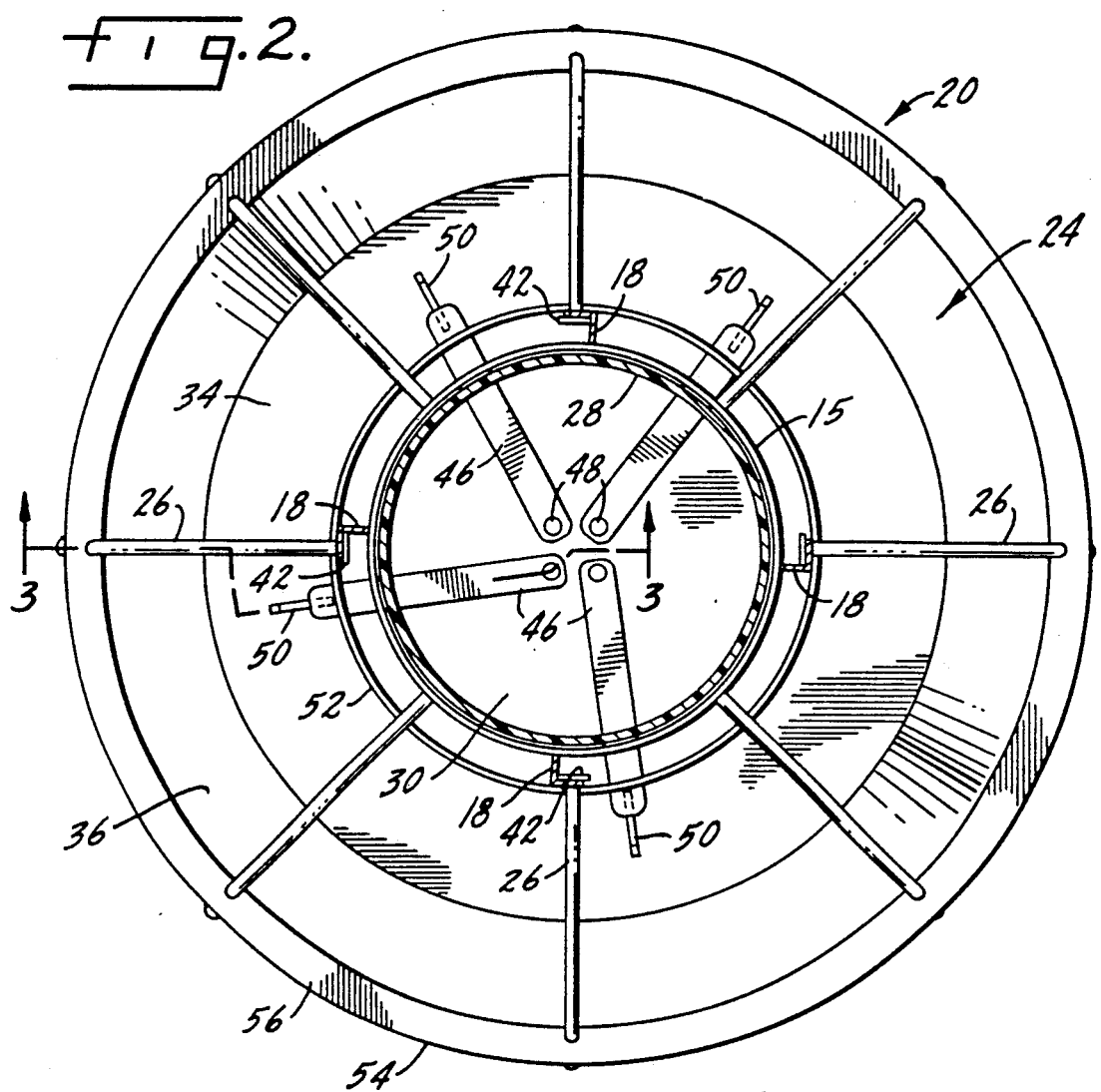
FIG. 2 is a section taken along line 2—2 of FIG. 1.

A plurality of vanes 46 are positioned on the plateau 30, one for each or two feeding station. Each vane is pivoted in any suitable manner, as a 48, toward its inner end as shown in FIG. 2 and extends outwardly through the feed gap 40 with a driver 50 suitably attached to its outer end and which extends down into the feeding trough. A hog may nose the driver back and forth which will reciprocate the vane 46 in the feed gap 40 thereby positively feeding grain or feed through the gap, across the ledge and into the feeding trough. The vanes are not connected to each other and therefore each is individually movable. When a hog is feeding, by moving his driver back and forth he will cause grain or feed to fall only into his feeding station and will not waste grain in the other possibly vacant feeding station.

A circumferential band 52 extends around the lower end of the uprights 18 and functions as a lick guard to prevent the hogs from licking the feed in the gap 40 which can result in the gap being plugged. It will be noted in FIG. 3 that the lick guard 52 is slightly beyond the inside of the feeding tray so that a hog cannot lick and prevent feed from falling into the tray. This is to say that the hog's first access to the feed is when it is in the bottom of the feed tray.

The outer peripheral edge of the feed tray has a chin ring 54 suitably mounted thereon and held in any suitable manner, such as by bolts. In the form shown, the chin ring is an angle with its upper flange 56 extending in somewhat and overlying the outer portion of the feed tray which will prevent a hog's chin or jowls from resting on the feed in the feed tray while he is feeding which can result in a loss of feed when the hog moves on to other things.

The upper guide 14 as shown in FIG. 1 may have a slot 58 of a suitable extent disposed on a helix. A suitable gauge in the form of a nut and bolt 62 may be mounted at a suitable point on the outside of the center tube 28. When the center tube is lowered down in the framework, the bolt 62 may be attached to the tube 28 and then moved down the helical incline 58 as the tube is turned. It will be noted in FIG. 1 that suitable graduations are provided along the sides of the incline so that the bolt may be suitably positioned at an appropriate graduation and then tightened up. The graduations correspond to the dimension of the gap 40, in FIG. 3, at the bottom of the center tube with the nut and bolt 62 serving as the physical support for the center chamber or pipe 28 in the upright framework. As shown, the graduations run from ¼ to ¾ which corresponds to the gap setting in each position. The nut and bolt 62 in addition to serving as the indicator also physically move the center pipe or chamber 28 up or down when it is rotated by the herdsman.

It is preferred that the base which is made up of the center or inner plateau 30, the ledge 44, the inclined inner wall 32, the base wall 34 and the outer frusto conical wall 36 all be a unitary piece made of fiberglass, plastic or stainless steel which avoids the problems that go with rust and corrosion of a metal base.

Figure 4:
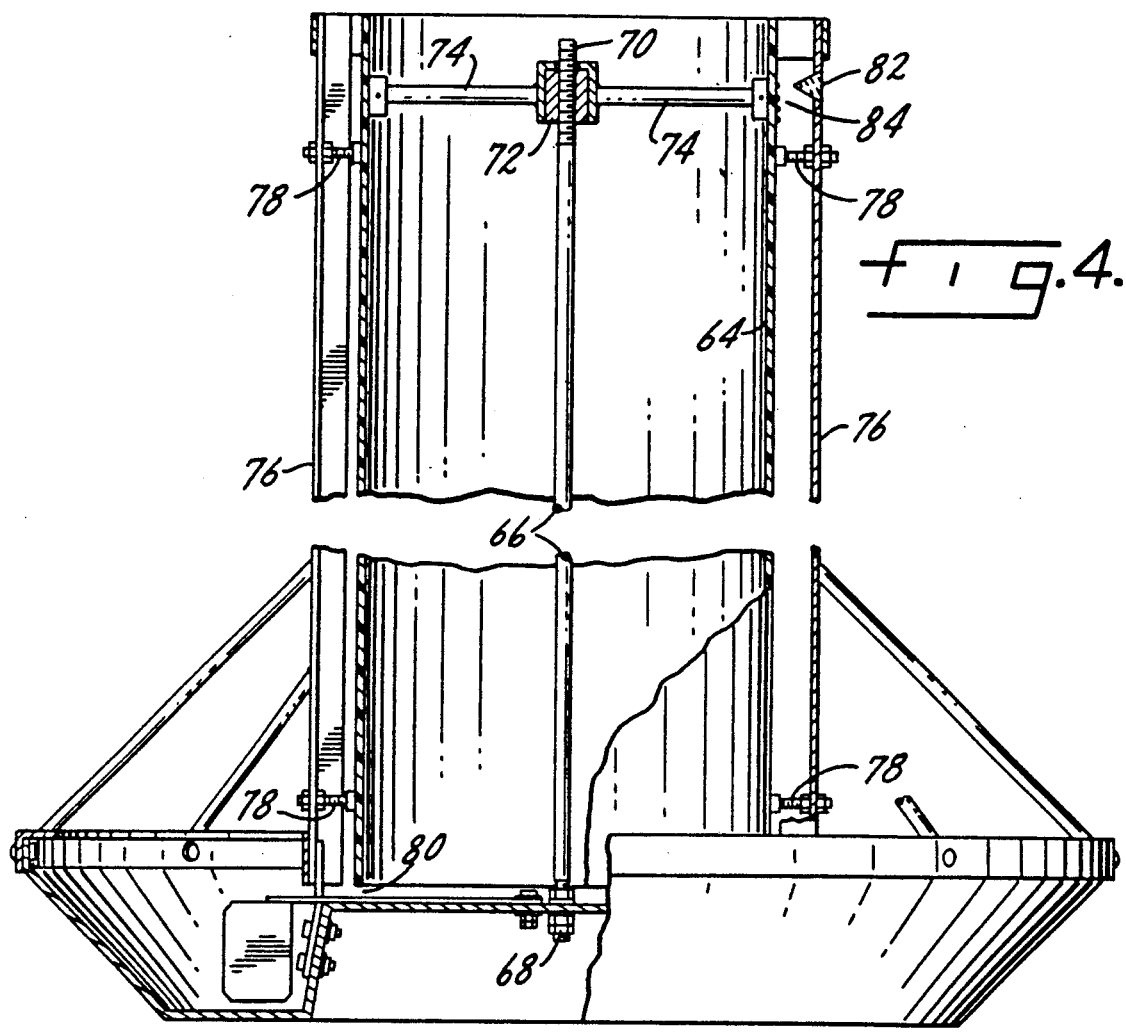
FIG. 4 is a vertical section of a variant form.

A variant form has been shown in FIG. 4 in which the feed reservoir 64 has an upright rod 66 positioned generally in the center of the base and suitably held there by a connection or mounting 68 with a high lead rod section 70 at the upper end of suitable length and pitch which engages a corresponding high lead nut 72 which is connected by a suitable number of radials 74, for example two, to the inside of the feed tube or reservoir 64. The reservoir holder or framework 76 carries a suitable number of positioners 78, both top and bottom to hold the feed reservoir in place but allow it to be rotated. The bottom edge of the feed reservoir defines a feed gap 80 with the base as before. At a suitable location on the upright framework or holder, a pointer or marker 82 may be disposed opposite suitable graduations 84 on the exterior of the feed reservoir.

The result is that when the herdsman rotates the feed reservoir either up or down on the stationary lead rod 70, the peripheral feed gap 80 may be made larger or smaller and the graduations 84 will indicate to the herdsman vis-a-vis the pointer 82 the size of the peripheral gap 80. The base and feeding trough may be the same as before.

Figure 5:
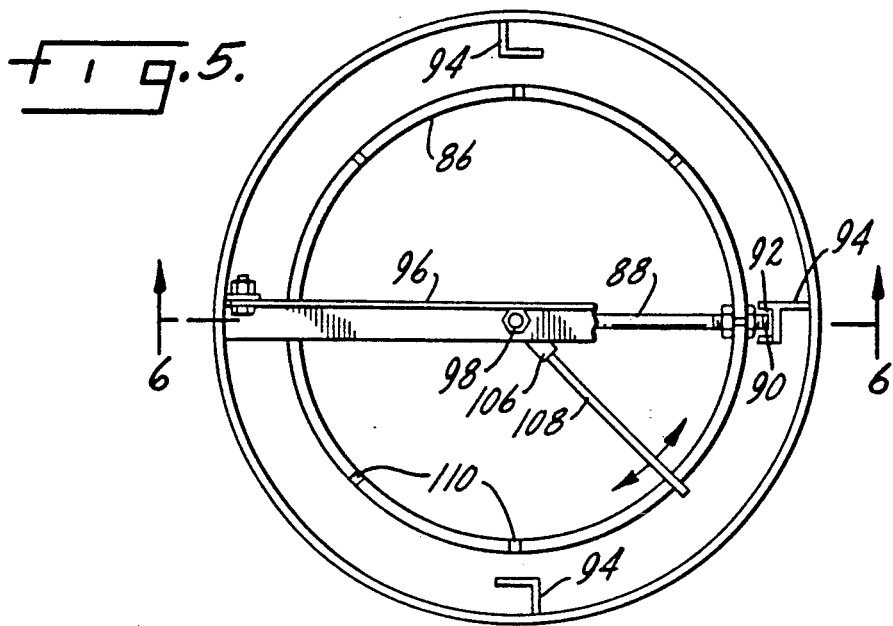
FIG. 5 is a horizontal section through a variant form.
Figure 6:
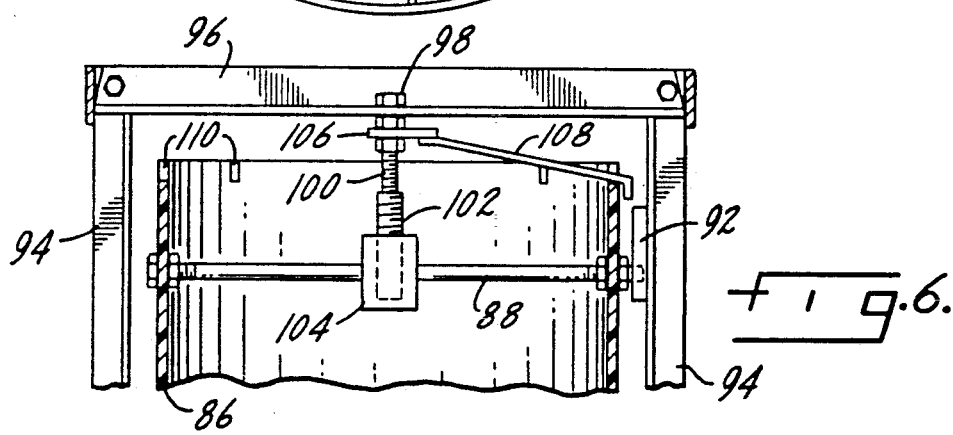
FIG. 6 is a section taken along line 6—6 of FIG. 5.

A further variant has been shown in FIGS. 5 and 6 in which the feed reservoir or cylinder 86 has a cross rod 88 suitably connected to the cylinder toward the upper end with one end 90 extending through and into a keyway or vertical slot 92 mounted or otherwise suitably formed in the feed reservoir holder or framework 94.

A cross angle 96 at the top of the framework supports a connection 98 in the center thereof for an axle 100 which has a bolt 102 on the lower end thereof that fits in a high lead nut 104 which is generally in the center of the cross brace 88. The connection 98 has a lever 106 with a handle 108 on the outer end thereof which may be fitted in one of a plurality of notches 110 around the upper end of the feed chamber 86. The connection 98 is relatively loose and is constructed and arranged so that when the handle 108 is rotated, the axle 100 and bolt 102 will also be rotated in the nut 104 which will raise or lower the feed tube or chamber 86 thereby varying the size of the feeding gap at the bottom. The key arrangement 90, 92 allows the feed tube 86 to be raised or lowered but keeps it from rotating. The handle 108 is spring biased downwardly and sufficiently flexible such that the herdsman can pick it up and move it either left or right as shown in FIG. 5 to the next notch or any desired notch. Each of the notches will carry a graduation which will correspond to the size of the feeding gap so that the herdsman will know when he has positioned the handle 108 in one of the notches that the gap is of a selected size.

Figure 7:
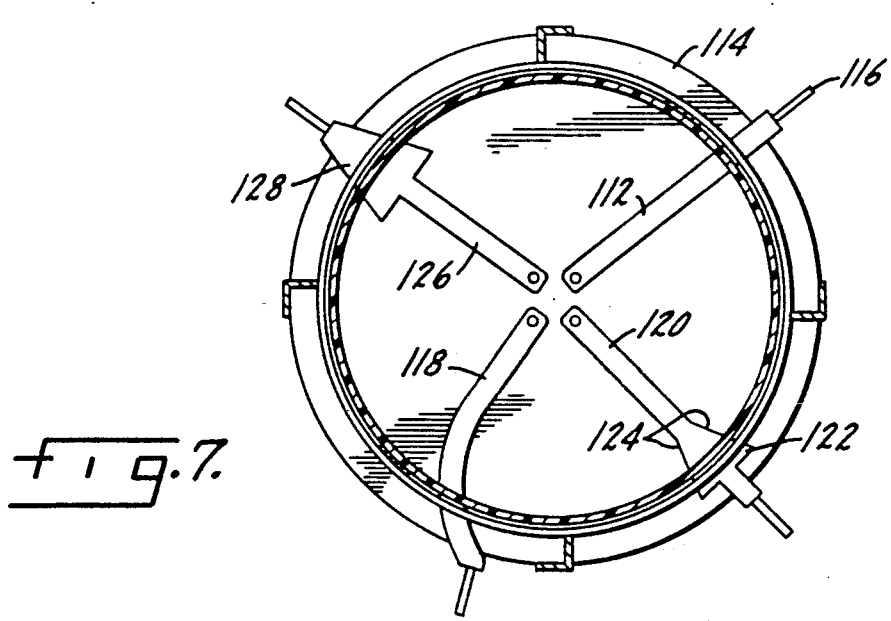
FIG. 7 is a horizontal section of a variant form.

In FIG. 7 a plurality of different vane structures have been shown. Whereas the four shown are all different, it should be understood that all vanes in an individual feeder may be the same, or a combination may be used in any particular feeder. As shown, vane 112 may be considered to have flat sides and extends beyond or across the ledge 114 with a driver 116 on its outer end that extends down into one of the feed chambers. The flat sides of the driver will move feed through the feed gap when the hog noses the driver 116 back and forth.

Even though the sides of vane 112 may be considered to be generally straight, it might be otherwise. For example, the side of the vane 118 has its sides arced or curvilinear which will change the feed flow rate. In the form shown, when the vane 118 is moved clockwise the feed flow rate will be greater and less or not at all when it is moved counterclockwise. Both sides of the vane could be concave or convex to cause more or less feed to be moved through the feeding gap and across the ledge 114.

Vane 120 has a formation 122 toward the outer end which is positioned in the feed gap and has divergent sides 124 which will cause the rate of feed through the gap and across the plateau to be less. Vane 126 may have a formation 128 which is just the reverse, i.e. the sides converge outwardly which will cause or result in a greater feeding rate. Any combination of vanes and feeding formations may be used to adjust or set a desired feeding rate through the feeding gap dependent upon conditions and requirements.

Figure 8:
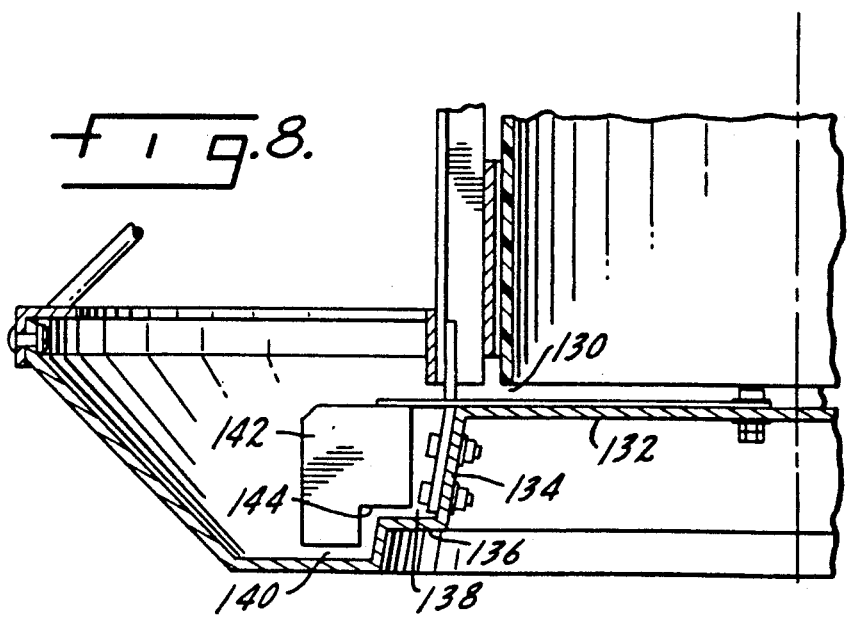
FIG. 8 is a partial vertical section, on an enlarged scale, of a further variant.

In FIG. 8 a variant form of feeding tray has been shown in which the feeding gap and ledge are indicated at 130 and 132. The inner wall 134 of the feeding tray has a step 136 which divides the feeding tray into upper and lower feed chambers 138 and 140. The driver 142 may be suitably contoured as at 144 to more or less match or conform to the step or two chambers so that the upper feeding chamber 138 will function as a dry feed chamber and the lower one 140 as a wet feed chamber or area.

The use operation and function of the invention are as follows.

A generally upright feed supply container is positioned so as to define a peripheral feeding gap at the bottom. A base element which has a plateau generally in the center opposes the bottom of the feeding chamber with vane-type movable elements extending through the peripheral gap at intervals constructed and arranged to be hog operated so that feed is positively conveyed by the vanes through the peripheral gap into a feeding trough in the base or bottom. Each vane has a driver element on the bottom which performs two functions. First, it enables the hog to move the vane element and second, it mixes the feed in the bottom of the feeding chamber, it being understood that the peripheral gap is above the bottom of the feeding chamber.

The unit is also provided with an extended ledge between the peripheral gap and the feeding chamber which is of such an extent that feed will not flow by gravity or vibration through the peripheral gap into the feeding chamber. Rather, a positive drive is required which is the vanes referred to previously.

A flat strap is provided which is in the nature of a lick guard around the outside of the peripheral gap so that the hog cannot lick and block the peripheral gap resulting in plugging.

The outlet slot between the bottom of the cylinder and the plateau is adjustable so that it may be increased or decreased depending upon the age of the hogs being fed. A number of different forms of adjustment have been shown and described and it is preferred that the adjustment have a visually indicating arrangement so that the herdsman can easily set the peripheral gap from the outside. Also the herdsman can determine what the setting is from a distance which enables him to determine what the setting is quickly and accurately from an aisle so that he does not have to enter each pen to check the setting. It is preferred that the indicator move on a magnified basis so that an inch or two of adjustment of the device results in a fraction of an inch change in the peripheral gap.

One of the important points of the invention is that the vanes are independent so that they are operated separately and individually by the hogs. When one hog is operating a driver to cause the vane in his feed compartment to bring grain or feed through the peripheral gap, he will not be causing grain to feed out into the other compartments. This is to say that each of the vanes and drivers is individual. This allows the feeder to be used as a fence line feeder. If one pen is sleeping and the other pen is eating, the eating hogs will not cause a buildup of feed on the sleeping pen side of the feeder.

The jowl guard shown in FIG. 2 has the advantage that it prevents feed from adhering to the jowls or lower chin of the animal and being carried away and wasted. When eating, the hog's jowls will rest on the chin ring which prevents the rest of the jowl from touching the sloping outer wall which may well have feed on it.

Variations in the vane contours may be used to change or affect the movement of feed through the feed slot or gap as explained in connection with FIG. 7. The combination of wet and dry feeder shown in FIG. 8 has the advantage that the lower feed area 140 may well be wet from the nipple waterers whereas the feed on the upper ledge may well remain dry. The highest level has the extended ledge. From the highest ledge, the hog may eat dry feed or nose the feed off the dry feed ledge and into the trough bottom if he prefers a wet feed.

While the preferred form and variations have been shown and suggested, it should be understood that suitable additional modifications, changes, substitutions and alterations may be made without departing from the invention's fundamental theme. Making the entire bottom out of fiberglass, plastic or stainless steel has clear advantages. As well the metal framework is preferably all galvanized. The adjustment of the outlet slot is important in that it enables the younger pigs to have a larger slot thereby providing them with more feed when they have not completely learned to operate the driver whereas older and more experience hogs may use a smaller gap.

The embodiments of the invention in which an exclusive property or privilege is claimed are defined as follows:

1. In a hog feeder, a circumferential base with a central plateau with an outside periphery, a feeding trough around the outside of and below the level of the plateau divided into a plurality of feeding stations, a hollow upright in the center of the base defining a feed supply chamber, a vertical peripheral gap between the bottom of the feed chamber and the plateau opening outwardly toward the feeding trough, the hollow upright being sufficiently smaller in diameter than the outside periphery of the plateau relative to the vertical dimension of the peripheral gap such that feed will not flow from the feed supply chamber to the feeding trough by gravity, a plurality of independent vanes, one for each feeding station, extending outwardly from an inner pivot on the plateau through the peripheral gap, each vane being pivoted independently of the other vanes, and a driver plate on and projecting downwardly from the outer end of each vane and disposed in the feeding trough for manipulation by a hog to cause feed to be moved outwardly by the vane through the peripheral gap from the feed supply chamber to the feed supply chamber to the feeding trough.

2. The structure of claim 1 further characterized in that the sides of at least some of the vanes are generally rectilinear.

3. The structure of claim 1 further characterized in that the sides of at least some of the vanes are generally curvilinear.

4. The structure of claim 1 further characterized in that the sides of a portion of at least some of the vanes that are in the peripheral gap are non radial.

5. The structure of claim 4 further characterized in that the non radial sides converge outwardly.

6. The structure of claim 4 further characterized in that the non radial sides diverge outwardly.

7. In a hog feeder, a circumferential base, a feeding trough around the outside of the base, a feed supply in the center of the base, a peripheral gap at the bottom of the feed supply located between the feed supply and the plateau of the base through which feed moves radially outwardly unencumbered to the feeding trough, and a lick guard above the feeding trough around the outside of the feed supply and spaced somewhat outwardly from and above and outwardly of the peripheral gap to prevent hogs from licking and clogging the peripheral gap, the radial outward movement of feed from the central feed supply through the peripheral gap to the entire feed trough being virtually unencumbered by any structural obstacles.

8. The structure of claim 7 further characterized in that the base includes a plateau in the general center thereof, the feeding trough being at a level below the plateau, the plateau extending a predetermined radial distance beyond the peripheral gap so that feed will not reach the feeding trough by gravity or vibration, and further including means for causing feed to move outwardly from the feeding chamber feed supply through the peripheral gap to the feeding trough.

9. In a hog feeder, a circumferential base, a feeding trough around the outside of the base, a hollow upright in the center of the base defining a feed supply chamber, means for adjusting the position of the hollow upright relative to the base so as to define a variable peripheral gap at the bottom of the feed chamber opening outwardly toward the feeding trough, means for causing feed to move outwardly from the feeding chamber through the peripheral gap unencumbered into the feeding trough, and a ledge extending outwardly between the peripheral gap and the feeding trough to prevent feed from reaching the feeding trough by gravity or vibration in all adjusted positions of the hollow upright, the radial outward movement of feed from the central feed supply through the peripheral gap to the entire feed trough being virtually unencumbered by any structural obstacles, the feeding trough is divided into a plurality of individual peripheral feeding stations, a vane extending through the peripheral gap for each of the feeding chambers, each of the vanes being separately pivoted toward their inner ends so that they may be separately operated by the hogs.

10. The structure of claim 9 further characterized in that the means for causing feed to move outwardly from the feeding chamber through the peripheral gap includes a movable vane extending outwardly through the peripheral gap.

11. The structure of claim 10 in which each of the vanes is constructed and arranged to be hog operated.

12. In a hog feeder, a circumferential base, a feeding trough around the outside of the base, a framework on and extending upwardly from the base, a generally hollow cylindrical upright in the framework defining a feed supply chamber, a peripheral gap between the bottom of the upright and the base for supplying feed from the feed supply chamber to the feeding trough, means for raising and lowering the upright in the framework to vary and set the size of the peripheral gap, and an indicator on the exterior of the feeder between the framework and the upright of a size and character so that a herdsman may observe the size of the peripheral gap from a distance.

13. The structure of claim 12 further characterized in that the indicator includes a helical slot in the framework, a connector in the slot extending into the cylindrical upright, and gradations on the helical slot operative with the connector to indicate the setting of the peripheral gap between the bottom of the cylindrical upright and the framework.

14. The structure of claim 12 further characterized by and including a mounting for the cylindrical upright so that it may be rotated relative to the framework.

15. The structure of claim 12 further characterized in that the cylindrical upright is mounted to be moved vertically and is held against rotation.

16. In a hog feeder, a circumferential base, a plateau in the center of the base at a level above the bottom of the base, a feeding trough around the outside of the base at a level below the plateau, a generally hollow upright above the plateau defining a feed supply chamber, a peripheral gap between the plateau and the upright for supplying feed from the feed supply chamber to the feeding trough, a plurality of independent generally rectilinear vanes extending outwardly from an inner pivot through the peripheral gap and constructed and arranged, upon being pivoted, to move feed from the feed supply chamber through the peripheral gap into the feeding trough, and a driver on the end of each vane projecting downwardly into the feeding trough to be engaged and manipulated by a hog so as to rotate the vane to cause feed to be moved through the peripheral gap and, at the same time, the lower portion of the driver will spread the contents in the feeding trough.

17. The structure of claim 15 further characterized by and including a ledge between the peripheral gap and the feeding trough of an extent such that it will prevent feed from reaching the feeding trough by gravity or by vibration.

18. The structure of claim 15 further characterized by and including means for adjusting the vertical size of the peripheral gap.

19. In a hog feeder, a circumferential base, a plateau in the center of the base at a level above the bottom of the base, a feeding trough around the outside of the base at a level below the plateau, a generally hollow upright above the plateau defining a feed supply chamber, a peripheral gap between the plateau and the upright for supplying feed from the feed supply chamber to the feeding trough, at least one vane extending outwardly from an inner pivot on the plateau through the peripheral gap and constructed and arranged, upon being pivoted, to move feed from the feed supply chamber through the peripheral gap into the feeding trough, a ledge on the inner portion of the feeding trough above the bottom thereof defining a dry feeding upper and inner area and an outer and lower wet feeding area, and a driver on the end of each vane projecting downwardly into the feeding trough and shaped to conform to the ledge so that a portion thereof will project into the upper and inner dry feeding trough and a portion thereof will project into the lower and outer wet feeding trough so that when the driver is engaged and manipulated by a hog to rotate the vane to cause feed to be moved through the peripheral gap, portions of the driver will mix the content in both areas of the feeding trough.

20. The structure of claim 19 further characterized by and including a ledge between the peripheral gap and the feeding trough of an extent such that it will prevent feed from reaching the feeding trough by gravity or vibration.

21. The structure of claim 19 further characterized by and including means for adjusting the vertical size of the peripheral gap.

22. A method of feeding hogs, including the steps of providing a generally upright cylindrical feed supply of a given outside diameter, surrounding the lower end of the feed supply with a generally circumferential feed trough below the lower end thereof and of an inner diameter greater than the outside diameter of the feed supply, supporting the feed supply at a predetermined distance from its lower end to provide a feeding gap of known size, also supporting the feed supply radially outwardly a certain distance from the feeding gap sufficient such that feed will not flow by gravity from the feed supply into the feed trough, moving feed across the radial outward support's sufficient distance by applying circumferential pressure thereto with a radial outward component and of substantial vertical extent applied at the bottom of the feeding trough, and allowing the feed to fall freely from the periphery of the certain distance into the feeding trough so as to thereafter be fully accessible to the hogs.

* * * * *